United States Patent [19]

Kohzai et al.

[11] 4,403,179
[45] Sep. 6, 1983

[54] CONTROL SYSTEM FOR STOPPING SPINDLE AT PREDETERMINED ROTATIONAL POSITION

[75] Inventors: Yoshinori Kohzai; Yoshiki Fujioka; Naoto Ota, all of Hino, Japan

[73] Assignee: Fujitsu Fanuc Limited, Tokyo, Japan

[21] Appl. No.: 216,835

[22] Filed: Dec. 15, 1980

[30] Foreign Application Priority Data

Dec. 31, 1979 [JP] Japan .................. 54/172682

[51] Int. Cl.³ .......................................... G05D 23/275
[52] U.S. Cl. ................................... 318/632; 318/653; 318/663
[58] Field of Search ............... 318/572, 632, 653, 571, 318/663

[56] References Cited

U.S. PATENT DOCUMENTS

| | | | |
|---|---|---|---|
| 3,393,588 | 7/1968 | Broome | 318/632 X |
| 3,449,554 | 6/1969 | Kelling | 318/572 |
| 3,581,204 | 5/1971 | Martin | 324/130 |
| 3,593,091 | 7/1971 | Ross | 318/572 |
| 4,251,761 | 2/1981 | Inoue | 318/632 X |
| 4,334,178 | 6/1982 | Lipp | 318/572 |

FOREIGN PATENT DOCUMENTS

2361972 3/1978 France .
1390753 4/1975 United Kingdom .
1459746 12/1976 United Kingdom .

*Primary Examiner*—B. Dobeck
*Attorney, Agent, or Firm*—Staas & Halsey

[57] ABSTRACT

A control circuit for stopping a spindle at a predetermined rotational position, of the type having a position sensor for producing a zero volt signal when a specified point on the spindle arrives at the predetermined rotational position, and for producing a voltage which is positive or negative when the specified point on the spindle is in the vicinity of the predetermined rotational position on either the left or right side thereof. The control circuit includes an orientation control circuit for stopping the spindle drive motor when the output signal from the position sensor attains the value of zero volts, thereby stopping the specified point on the spindle at the predetermined rotational position. The control circuit further includes a position adjustment circuit for adjusting the rotational position, of the specified point on the spindle, at which the output signal from the position sensor crosses the zero volt line. The position at which the specified point is stopped is adjusted by the position adjustment circuit, so that it is possible to correct an error in the stopping position which results from a position sensor mounting error.

5 Claims, 14 Drawing Figures

CONTROL SYSTEM FOR STOPPING SPINDLE AT PREDETERMINED ROTATIONAL POSITION

CROSS REFERENCES TO RELATED APPLICATIONS

This application is related to the following applications:

(1) U.S. application Ser. No. 216,836 by Kohzai et al. entitled "Control System for Stopping Spindle at Predetermined Rotational Position"; and (2) U.S. application Ser. No. 216,837 by Kohzai et al. entitled "Control System for Stopping Spindle at Predetermined Rotational Position".

BACKGROUND OF THE INVENTION

This invention relates to a system for stopping a spindle at a predetermined rotational position in which a specified point on the spindle is stopped at the predetermined position, and more particularly to a control system of the type described in which a position sensor mounting error is corrected electrically to enable the spindle to be stopped with a high degree of accuracy.

Some machine tools which are known in the art have an automatic tool changing function which allows machining to be performed while a variety of tools mounted on the machine are interchanged automatically. The tool changing operation proceeds as follows. First, a magazine holding a number of tools is revolved to bring a vacant tool holding portion of the magazine into position directly above a spindle mechanism. The spindlle mechanism, which is grasping an old tool to be exchanged for a new one, is then moved forwardly, after which the magazine positioned above the spindle mechanism is lowered to permit the old tool to be received and grasped by the vacant tool holding portion of the magazine. The spindle mechanism is then retracted so that the old tool separates from the spindle, thereby transferring the old tool to the magazine. Next, the magazine is revolved to bring a desired new tool into position in front of the spindle, and the spindle mechanism is moved forward to allow the spindle to receive and to grasp the new tool. Finally, the magazine is raised away from the spindle to complete the tool change operation.

It is necessary in the tool change mechanism of the foregoing type that a prescribed part of the spindle, such as a keyway, be stopped accurately at the correct rotational position in order to permit the fitting portions of the spindle and tool to mate with each other smoothly. More specifically, a keyway is formed in the spindle and a key is formed on the tool in order to mate with the keyway. The smooth mating of the spindle and tool requires that the spindle be positioned and stopped in order to provide the correct alignment of key and keyway. Meeting the above requirement necessitates a high spindle positioning accuracy of $\pm 0.05°$ with respect to the angle of rotational of the spindle.

Conventional automatic tool change mechanisms have a photoelectric detector or with limit switch mechanism which detect the rotational position of the spindle keyway in order to facilitate the smooth mating of the spindle and tool. The arrangement is such that the spindle is brougt to a stop at the prescribed position by the application of a mechanical brake which is actuated in response to a signal from the position detection means.

The foregoing apparatus employs a stopping mechanism that experiences wear with a long period of use since the mechanism relies upon a mechanical pin or brake or the like. Such wear, particularly of a brake shoe or pin, makes it progressively more difficult to stop the spindle at the predetermined position, and the result is that the automatic changing of tools cannot proceed smoothly.

Accordingly, there is a need for a control system which is capable of stopping a spindle at a predetermined rotational position with a high degree of accuracy purely by electrical means, without relying upon a mechanical pin or mechanical brake mechanism to stop the spindle when performing an automatic tool change operation.

To this end, the assignee of the present invention have already proposed a control system, disclosed in copending U.S. patent applications by Kohzai et al. with Ser. No. 190,659, entitled "Spindle Rotationl Control System", and by Fujioka with Ser. No. 215,631, entitled "Control System for Stopping Spindle at Predetermined Rotational Position", both assigned to the assignee of the present invention, for stopping a spindle in such a manner that a specified point on the spindle is brought to a stop at a predetermined rotation position purely through electrical means. The proposed control system includes a position sensor and an orientation control circuit. The position sensor generates a signal having a prescribed level, such as zero volts, when the specified point on the spindle arrives at the predetermined rotational position, and generates a positive or negative voltage when the specified point is in the vicinity of the predetermined rotational position, the polarity of the non-zero voltage depending upon whether the specified point is to the right or left of the predetermined position. The orientation control circuit stops the spindle drive motor when the output signal from the position sensor attains the value of zero volts, thereby stopping the specified point on the spindle at the predetermined rotational position.

In the proposed system the position sensor is mounted within the spindle mechanism and is emersed in machine oil which fills the interior of the spindle box. It is therefore extremely troublesome to positionally adjust or remove the position sensor once it has been mounted. Although the sensor is carefully mounted after precise mechanical positioning within the degree of accuracy of $\pm 0.05°$, inspection after assembly occasionally reveals that the sensor has been shifted from its correct position. In such cases the error must be corrected by finely adjusting the position at which the sensor is mounted.

BRIEF SUMMARY OF THE INVENTION

It is an object of the present invention to provide a control system for stopping a spindle in such a manner that a specified point on the spindle can be stopped at a predetermined rotational position with a high degree of accuracy.

It is another object of the present invention to provide a control system for stopping a spindle at a predetermined rotational position, in which it is possible to effect a simple correction of a discrepancy between a specified point on the spindle and the predetermined rotational position at which said point is to be stopped, the discrepancy resulting from a position sensor mounting error.

It is a further object of the present invention to provide a control system for stopping a spindle at a predetermined rotational position, in which it is possible to electrically correct an error in the stopping position of the spindle, which is the error resulting from a position sensor mounting error, without actually adjusting the position at which the sensor is mounted.

Other features and advantages of the invention will be apparent from the following description taken in conjunction with the accompanying drawings.

DESCRIPTION OF THE PREFERRED EMBODIMENT

Figure 1:
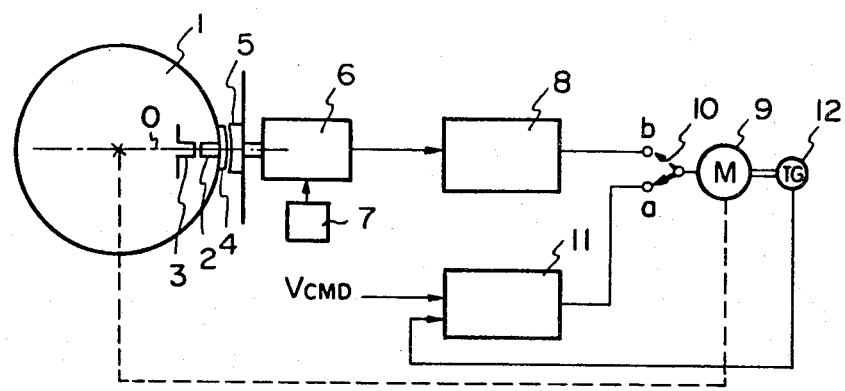
FIG. 1 is a simplified block diagram of a control system for stopping a spindle at a predetermined rotational position in accordance with the present invention.
Figure 2:
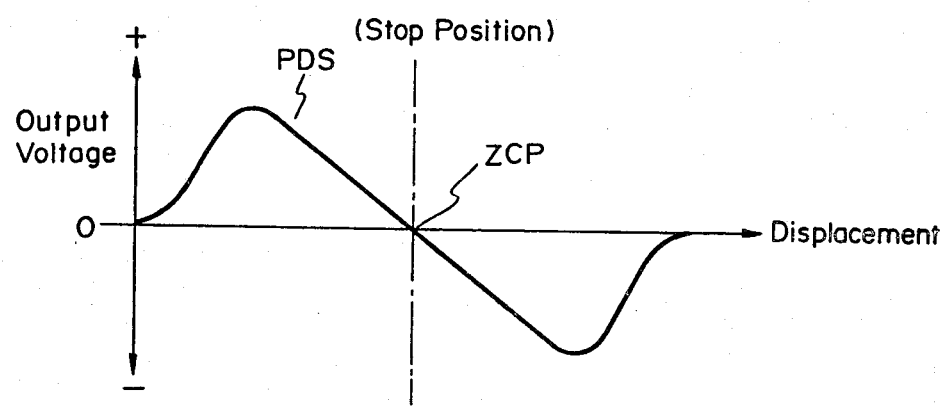
FIG. 2 is a waveform diagram of a spindle position displacement signal produced by a position sensor.

Referring now to FIG. 1, a spindle 1 is provided with a keyway 2 for mating with a key 3 which is provided on a tool. A magnet 4 is attached to the side of the spindle 1 and is accurately positioned prior to assembly of the spindle mechanism in such a manner that the center of the magnet coincides with a line passing through an origin or "home" point O. A position sensor 5 is constructed so that it generates a spindle position displacement signal PDS crossing the zero volt line and having one minimum and one maximum, as shown in FIG. 2. The position displacement signal PDS is generated as the magnet 4 on the spindle passes the front of the position sensor 5. A position adjustment circuit 6 is adapted to shift, to the left or right, a zero cross point ZCP which is where the position displacement signal PDS output by the position sensor 5 crosses the zero voltage line. The position adjustment circuit is operated by a regulator 7 which causes the position adjustment circuit 6 to shift the zero cross point ZCP in a fully electrical manner. An orientation control circuit 8 receives the output of the position adjustment circuit 6 and is constructed so that it stops the spindle 1 in such a manner that a specified point thereon, such as the keyway 2, is brought to a stop at the home position 0. Specifically, the orientation control circuit 8 stops a spindle motor 9 when a zero volt signal is output by the position adjustment circuit 6, that is, when the magnet 4 on the spindle directly confronts the position sensor 5. A change-over switch 10 at the input to the motor 9 is adapted to switch between the orientation output of the control circuit 8 or the output of a speed control device 11. The rotational speed of the motor 9 is detected by a tachometer generator 12 the output of which is connected to the speed control device 11, the function of which will be mentioned below.

In operation, the changeover switch 10 is connected to the a side when the spindle is rotating as, for example, during a machining operation. As a result, the speed control device 11, which is receiving a speed command signal $V_{CMD}$, causes the spindle motor 9 to rotate in dependence upon the speed command so that machining work can be carried out. When the spindle is to be stopped for a tool change or the like, first the speed command signal $V_{CMD}$ being applied to the speed control device 11 is gradually reduced in amplitude, thereby causing the spindle motor 9 to slow down. As the rotational speed of the motor drops to several rpm and the magnet 4 approaches the vicinity of the position sensor 5, the machine tool is switched over from the normal operating mode to the orientation mode, the associated signal causing the changeover switch 10 to switch from the a side to the b side. The orientation control circuit 8 includes a comparator which compares the output of the position sensor 5 with a zero volt signal and controls the rotation of the spindle motor 9 so as to reduce to zero the difference between the position sensor signal and the zero volt signal. The orientation control circuit 8 brings the spindle to a stop when the keyway 2 thereof reaches the home position 0, that is, when the spindle position displacement signal PDS output by the position sensor 5 falls to the zero value.

Figure 3:
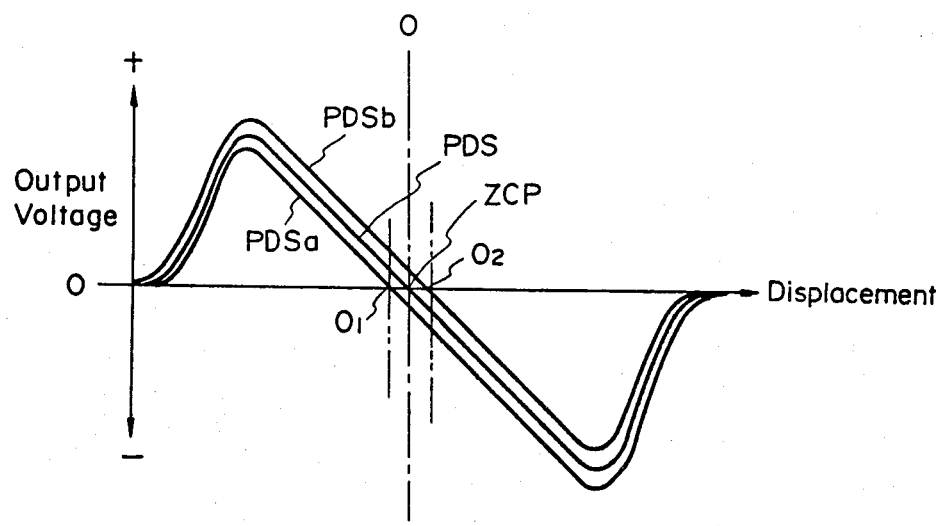
FIG. 3 is a waveform diagram which is useful in describing the manner in which a spindle position displacement signal is shifted due to a position sensor mounting error.

If the position sensor 5 should happen to be displaced from the correct mounting position, it is obvious that the keyway on the spindle 1 will not stop at the home position 0 but will stop instead on one side or the other of the home position, depending on where the output of the position sensor 5 crosses the zero line. In other words, if the position at which the position sensor is mounted is incorrect, the zero cross point ZCP will be shifted to the point $O_1$ or to the point $O_2$ or any point in between, as shown in FIG. 3. The result will be a shift in the position at which the spindle is brought to a stop.

In accordance with a feature of the present invention, the shift mentioned above is corrected for by operating the regulator 7. This causes the position adjustment circuit 6 to apply a translation to the spindle position displacement signal $PDS_a$ or $PDS_b$ (FIG. 3) generated by the position sensor 5, thereby bringing the zero cross point into coincidence with the origin or home position 0. It should be noted that the signals $PDS_a$ and $PDS_b$ represent the position sensor output when the sensor is not mounted at the correct position. The result of moving the zero cross point to the home position 0 is to correct for the shift in the spindle stopping position which is caused by the error in the sensor mounting position. The correction assures that the spindle 1 will be stopped when the center of keyway 2 coincides perfectly with the origin or home position 0.

Figure 4:
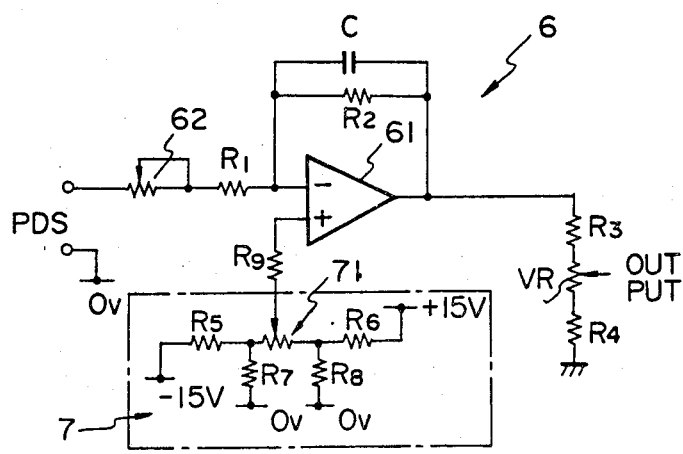
FIG. 4 is a circuit diagram of a position adjustment circuit.

The position adjustment circuit 6 and regulator 7 may be understood more fully from the detailed circuit diagram of FIG. 4. Included is an operational amplifier 61 in which the amplitude of the output voltage is regulated by a variable resistor 62. The regulator 7 includes a variable resistor 71 for shifting the zero cross point. $R_1$ through $R_9$ denote resistors, VR a variable resistor, and C a capacitor.

In operation, the operational amplifier 61 generates an output signal generated by suitably amplifying the input signal applied thereto. The zero cross point of the amplifier output voltage is shifted by varying a voltage, namely an offset voltage, which is impressed upon a positive input terminal of the amplifier. Hence, in accordance with the invention, the resistors $R_5$ through $R_8$ and the variable resistor 71 that comprise the regulator 7 are connected as shown in FIG. 4 to allow variation of the offset voltage applied to the operational amplifier 61. More specifically, changing the resistance value of the variable resistor 71 varies the offset voltage of the operational amplifier in either the positive or negative direction. As a result, if the spindle position displacement signal PDS is applied to the operational amplifier 61, varying the value of the variable resistor 71 shifts, to the left or right, the zero cross point of the amplifier output voltage.

Reference will now be made to FIGS. 5 and 6 in order to describe the structure and operation of the position sensor for detecting the rotational position of the spindle 1.

Figure 5A:
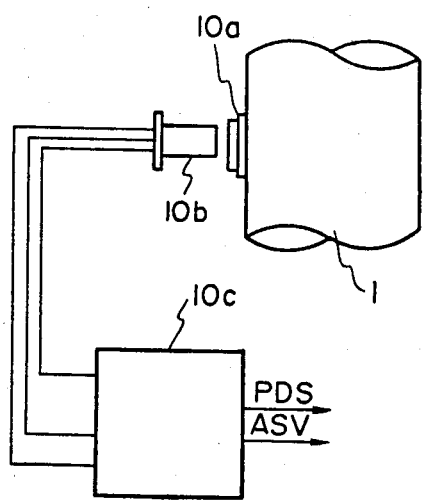
FIGS. 5(A) through 5(F) and FIGS. 6(A) through 6(D) are illustrative views which are useful in describing the operation and structure of a magnetic sensor which is employed as a position sensor.
Figure 5B:
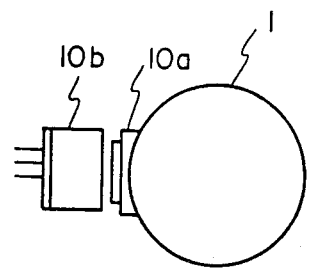
Figure 5C:
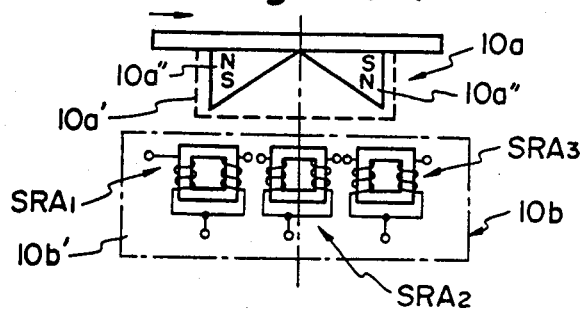
Figure 5D:
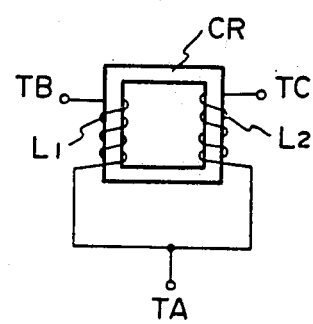

Referring first to FIGS. 5(A) and 5(B), the position sensor, which corresponds to the position sensor 5 in FIG. 1, includes a magnetic body 10a, corresponding to the magnet 4 in FIG. 1, a sensing portion 10b, and an electrical circuit 10c. FIG. 5(A) is a front view which shows the magnetic body 10a mounted on the spindle 1, and FIG. 5(B) is a plan view of the same. The magnetic body 10a is mounted on the spindle 1 at an angular position thereof corresponding to the specified point which is to be stopped at the predetermined rotational position. The magnetic body 10a, as shown in FIG. 5(C), has magnets 10a', having a triangular cross-section, mounted in a case 10a' in such a manner that the intensity of the magnetic field changes from S to N in the direction of spindle rotation, i.e., in the direction of the arrow. The sensing portion 10b is mounted on a mechanically stationary portion of the machine so as to confront the magnetic body 10a, and includes three saturable reactors $SRA_1$, $SRA_2$ and $SRA_3$ provided in a case 10b' and aligned in the direction of spindle rotation, as illustrated in FIG. 5C. Coils $L_1$ and $L_2$ are wound on a core CR of each saturable reactor, as depicted in FIG. 5(D). The coils $L_1$ and $L_2$ on the core CR are so wound as to have opposing polarities. The coils on each core share a common terminal TA to which a high-frequency signal is applied, and as a result position signals which are in dependence upon the rotational position of the magnetic body 10a are generated at the terminals TB and TC of the respective coils.

Figure 5E:
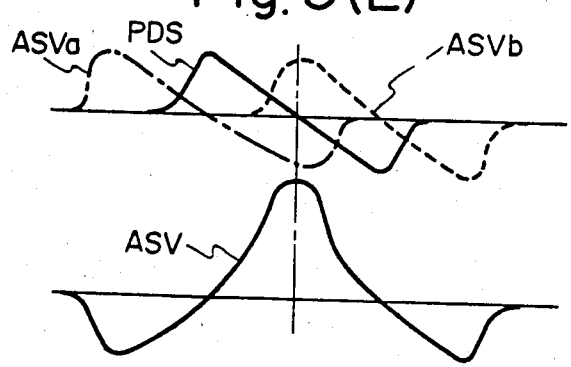
Figure 5F:
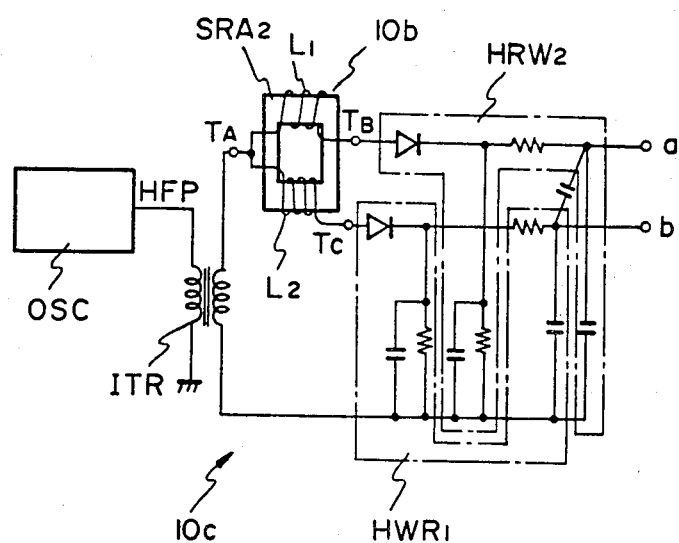

Shown in FIG. 5(E) are voltage waveforms obtained from sensing circuits, which will be described later, which are for corresponding ones of the saturable reactors $SRA_1$ through $SRA_3$, the position signals being generated when the magnetic body 10a and sensing portion 10b have the positional relationship shown in FIG. 5(C). Specifically, $ASV_a$, PDS and $ASV_b$ denote the voltage waveforms from the sensing circuits corresponding to the respective saturable reactors $SRA_1$, $SRA_2$ and $SRA_3$. Each of these waveforms has a value of zero volt when the center line of the corresponding saturable reactor $SRA_1$, $SRA_2$ or $SRA_3$ coincides with the center line of the magnetic body 10a. At such time the waveform is positive on one side of the zero value and negative on the other side; that is, it completely crosses the zero level. The voltage signal PDS serves as the spindle position displacement signal. Furthermore, a voltage signal ASV serves to indicate that the specified point on the spindle has reached the vicinity of the predetermined rotational position at which the specified point is to be stopped. The signal ASV is generated by adding together the voltage $ASV_b$ and a voltage which results by subjecting the voltage $ASV_a$ to a phase shift of 180 degrees. A sensing circuit corresponding to one of the saturable reactors, namely the reactor $SRA_2$, is shown in detail in FIG. 5(F). The sensing circuit, which is included in the electrical circuit 10c, includes a pulse oscillator OSC for generating a 100 kHz high-frequency pulse signal HFP, an isolating transformer ITR, and half-wave rectifiers $HWR_1$ and $HWR_2$. The saturable reactor $SRA_2$ is excited by the high-frequency pulse signal HFP through the intermediary of the isolating transformer ITR. As a result, the output voltage PDS, shown in FIG. 5E, is generated between the output terminals a and b of the circuit shown in 5(F), this output voltage being approximately proportional to the external magnetic field $H_{ext}$. Strength varies in dependence upon the rotational position of the magnetic body 10a.

Figure 6A:
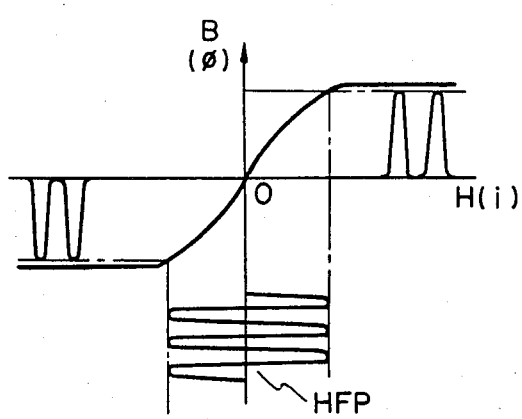
Figure 6B:
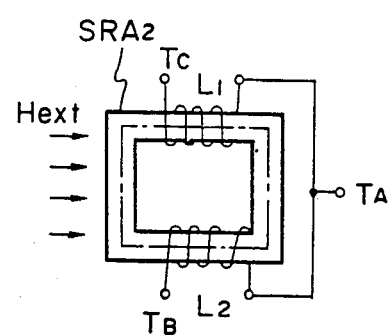
Figure 6C:
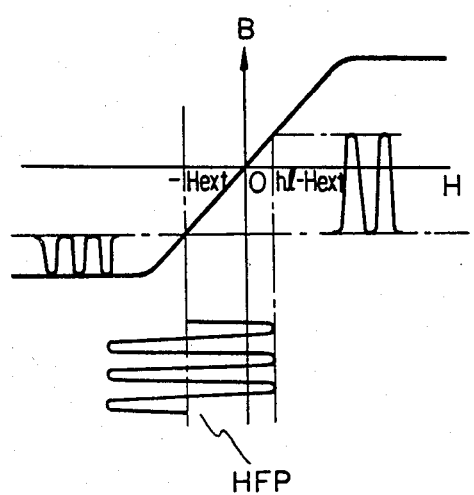
Figure 6D:
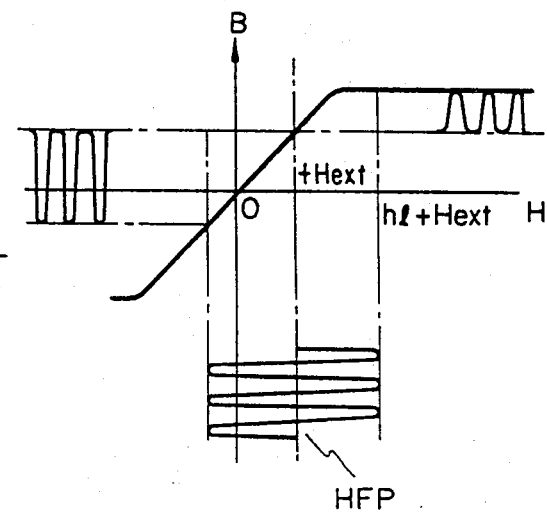

The action of the voltage waveform PDS generated across the terminals a and b will now be described with reference to FIG. 6 in connection with the reactor $SRA_2$. When the magnetic body 10a is remote from the saturable reactor $SRA_2$ so that the external magnetic field acting upon the reactor $SRA_2$ has a value approaching zero, the high frequency pulse signal HFP acts about the vertical zero line of the reactor B-H curve, as shown in FIG. 6(A). As a result, the number of lines of flux cutting the coils $L_1$ and $L_2$ are equal, so that the output voltages from the terminals $T_B$ and $T_C$ are equal in amplitude but displaced in phase by 180°. It should be noted that since these voltages are rectified by the respective half-wave rectifiers $HWR_1$ and $HWR_2$, the potentials at the terminals a and b are equal, so that the voltage across a and b is zero. Now, as the magnetic body 10a approaches the saturable reactor $SRA_2$, the external magnetic field $H_{ext}$ being generated by the magnetic body begins to act upon the reactor $SRA_2$. If we let $h_l$ denote the field generated by the high-frequency pulse signal HFP, a flux of $h_l - H_{ext}$ will cut the coil $L_1$, as shown in FIG. 6(C), and a flux of $h_l + H_{ext}$ will cut the coil $L_2$. If this is expressed using a B-H curve, the high-frequency pulse signal HFP will act about the line $-H_{ext}$ with respect to coil $L_1$, as shown in FIG. 6(C), and about the line $+H_{ext}$ with respect to coil $L_2$, as depicted in FIG. 6(D). Therefore, the negatively directed flux which cuts the coil $L_1$ causes saturation of the core so that there is a smaller amount of amplitude variation, whereas the negatively directed flux which cuts the coil $L_2$ does not cause saturation so that there is a greater amount of amplitude variation. Because the induced voltage e takes on the value $-Nd\phi/dt$ (where N is the number of turns), the potential at the terminal b will become greater than the potential at the terminal a, giving rise to a potential difference across the terminals. This potential difference will vary as shown by the curve $ASV_b$ in FIG. 5(E) as the magnetic body 10a continues to rotate. It should be noted that the detection voltage PDS corresponds to the spindle position displacement signal PDS shown in FIG. 2. This completes the description of the position detector.

In accordance with the present invention as described in detail above, the zero cross point of the spindle position displacement signal can be shifted electrically by adjusting a regulator having a very simple construction. This allows the rotational stopping position of the spindle to be corrected without positionally correcting the position sensor and/or magnet which are incorporated in the spindle mechanism of a machine tool. This in turn permits the center of the spindle keyway to be brought into coincidence with the origin or home position in an accurate manner through electrical means, unlike the mechanical position adjustment required in the prior art. It should also be noted that the invention is obviously applicable to servo systems other than the type of servo system shown in FIG. 1.

Although the present invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:

1. A control system for stopping a spindle at a predetermined rotational position, comprising:
   a position sensor, coupled to the spindle, for generating an output signal having a predetermined level when a specified point on the spindle arrives at the predetermined rotational position and for generating a voltage which is positive or negative with respect to said predetermined level when the specified point on the spindle is within a predetermined range of the predetermined rotational position on either side thereof;
   an orientation control circuit, operatively connected to the spindle drive motor, for stopping the spindle drive motor when the output signal output by said position sensor attains said predetermined level, thereby stopping the specified point on the spindle at the predetermined rotational position; and
   a position adjustment circuit, operatively connected between said sensor and said orientation control circuit, for adjusting the position, of the specified point on the spindle, at which the output signal output by said position sensor crosses said predetermined level.

2. A control system according to claim 1, wherein said position sensor output signal predetermined level is zero volts.

3. A control system according to claim 1 or 2, wherein said position adjustment circuit generates a variable offset voltage, wherein said position adjustment circuit comprises an amplifier circuit for amplifying the output signal output by said position sensor in dependence upon the variable offset voltage.

4. A control system for a spindle motor and a spindle, for stopping a specified point on the spindle at a predetermined rotational position, comprising:
   a spindle position sensor, coupled to the spindle, for generating a spindle displacement signal which indicates the displacement of the specified point on the spindle from the predetermined rotational position;
   means, operatively connected to said spindle position sensor, for shifting the spindle displacement signal to generate a shifted spindle displacement signal which is used to correct for any error in mounting said spindle position sensor, said means for shifting comprising:
   a regulator for generating an offset voltage signal to correct the mounting error; and
   a position adjustment circuit, operatively connected to said spindle position sensor, to said orientation control circuit and to said regulator, for producing the shifted spindle displacement signal in dependence upon the offset voltage signal, said position adjustment circuit comprising:
   a first variable resistor having a first terminal operatively connected to said spindle position sensor and having a second terminal;
   a first resistor having a first terminal operatively connected to the second terminal of said first variable resistor and having a second terminal;
   an amplifier having a first input operatively connected to the second terminal of said first resistor, having a second input and having an output;
   a second resistor operatively connected between the first input and the output of said amplifier;
   a capacitor operatively connected between the first input and the output of said amplifier;
   a second variable resistor, having a first terminal operatively connected to the output of said amplifier, having a second terminal operatively connected to said orientation control circuit, and having a third terminal operatively connected to ground, for outputting the shifted spindle displacement signal; and
   a fifth resistor having a first terminal operatively connected to the second input of said amplifier and having a second terminal operatively connected to said regulator; and
   an orientation control circuit, operatively connected to said means for shifting the displacement signal and to the spindle motor, for stopping the spindle motor in dependence upon the shifted spindle displacement signal, so that the specified point on the spindle is stopped at the predetermined rotational position.

5. A control system as recited in claim 4, wherein said regulator comprises:
   a third resistor having a first terminal operatively connected to a first reference voltage and having a second terminal;
   a fourth resistor having a first terminal operatively connected to a second reference voltage and having a second terminal;
   a third variable resistor having first and second terminals operatively connected between the second terminals of said third and fourth resistors, respectively, and having a third terminal, operatively connected to said position adjustment circuit, for outputting the voltage offset signal;
   a sixth resistor operatively connected between the second terminal of said third resistor and a third reference voltage; and
   a seventh resistor operatively connected between the second terminal of said fourth resistor and the third reference voltage.

* * * * *

UNITED STATES PATENT AND TRADEMARK OFFICE
CERTIFICATE OF CORRECTION

PATENT NO. : 4,403,179

DATED : September 6, 1983

INVENTOR(S) : Yoshinori Khozai et al

It is certified that error appears in the above-identified patent and that said Letters Patent is hereby corrected as shown below:

Column 1, line 34, "forwardly" should be --forward--;

line 65, "brougt" should be --brought--.

Column 3, line 59, "the orientation" should be --the output--;

"the control" should be --the orientation control--;

line 66, "a" should be --$\underline{a}$--.

Column 4, line 13, "a" should be --$\underline{a}$--;

"b" should be --$\underline{b}$--.

Column 5, line 23, "10a'" should be --10a''--.

UNITED STATES PATENT AND TRADEMARK OFFICE
CERTIFICATE OF CORRECTION

PATENT NO. : 4,403,179

DATED : September 6, 1983

INVENTOR(S) : Yoshinori Khozai et al

It is certified that error appears in the above-identified patent and that said Letters Patent is hereby corrected as shown below:

Column 6, line 45, "e" should be --$\underline{e}$--;

line 47, "b" should be --$\underline{b}$--;

line 48, "a" should be --$\underline{a}$--.

Signed and Sealed this

Twentieth Day of March 1984

[SEAL]

Attest:

Attesting Officer

GERALD J. MOSSINGHOFF

Commissioner of Patents and Trademarks